United States Patent [19]

Ishikawa

[11] Patent Number: 5,468,065
[45] Date of Patent: Nov. 21, 1995

[54] MOLDED TAPE CASSETTE

[75] Inventor: Ko Ishikawa, Miyagi, Japan

[73] Assignee: Sony Corporation, Tokyo, Japan

[21] Appl. No.: 191,076

[22] Filed: Feb. 3, 1994

Related U.S. Application Data

[62] Division of Ser. No. 47,294, Apr. 19, 1993.

[30] Foreign Application Priority Data

Apr. 30, 1992 [JP] Japan ................................ 4-111139

[51] Int. Cl.$^6$ ................................................ G11B 23/087
[52] U.S. Cl. ............................ 360/132; 242/347; 264/255
[58] Field of Search ............................ 360/132; 242/198, 242/347; 264/250, 255

[56] References Cited

U.S. PATENT DOCUMENTS

| 4,688,128 | 8/1987 | Shiba et al. | 360/132 |
| 4,840,760 | 6/1989 | Oishi | 264/255 |
| 5,192,481 | 3/1993 | Morita | 264/255 |
| 5,229,905 | 7/1993 | Morita | 360/132 |

FOREIGN PATENT DOCUMENTS

| 59-207074 | 11/1984 | Japan . |
| 029075 | 1/1990 | Japan . |
| 03207068 | 9/1991 | Japan . |

*Primary Examiner*—Stuart S. Levy
*Assistant Examiner*—Paul J. Ditmyer
*Attorney, Agent, or Firm*—Jay H. Maioli

[57] ABSTRACT

In order to produce a cassette, such as tape cassette, disc cassette or the like, the following steps are taken. First, fixed and movable dies are prepared which are unitable to define therewithin a shaped cavity. The movable die has at its inner surface a retaining ridge which includes a first portion immediately projected from the inner surface and a second portion immediately projected from the first portion. The second portion has side walls at least one of which has a laterally extending projection at the position remote from the first portion. Second, the fixed and movable dies are coupled to define the shaped cavity therewithin. Third, a plastic material is injected into the shaped cavity in such a manner that the retaining ridge is immersed in the injected plastic material. Fourth, the fixed and movable dies are uncoupled and a cured molded article of the plastic material thus produced is released from the movable die. Due to the unique configuration of the retaining ridge, undesirable burrs which are inevitably produced on the molded article are entirely positioned in a groove which is formed in the article by the retaining ridge.

5 Claims, 5 Drawing Sheets

MOLDED TAPE CASSETTE

This is a division of application Ser. No. 08/047,294, filed Apr. 19, 1993.

BACKGROUND OF THE INVENTION

1. Field of the Invention

The present invention relates in general to a method and a device for molding cassettes, such as tape cassettes, disc cassettes or the like, which contain therein a recording tape or recording disc. More specifically, the present invention is concerned with a method and a device for molding cassettes of a type which comprise injection-molded plastic lower and upper cassette halves.

2. Description of the Prior Art

In order to clarify the task of the present invention, one conventional method for molding a cassette of the above mentioned type will be described with reference to FIGS. 8 and 9 of the accompanying drawings.

The cassette which will be described in the following is a tape cassette which comprises generally lower and upper cassette halves which are united to constitute a rectangular case for containing therein a recording tape. Each cassette half has a double-layered structure which includes a lower resiliency plastic layer (or inner layer) and a higher resiliency plastic layer (or outer layer) which are laid on each other. Due to the provision of the lower resiliency plastic layer, undesired vibration applied to the cassette is absorbed.

Referring to FIG. 8, there is shown a rotary type injection molding device 101 for molding halves of the tape cassette. The molding device 101 generally comprises a first fixed die 103, a second fixed die 106 and a movable die 104. First and second resin feeding cylinders 102 and 108 are respectively connected to the first and second fixed dies 103 and 106 for feeding them with respective materials for the lower and higher resiliency plastic layers. Each die shown in the drawing is shaped to have two rectangular cavities.

For producing the cassette half, the following steps are taken.

First, the movable die 104 is coupled with the first fixed die 103, and then, the first resin feeding cylinder 102 injects the material for the lower resiliency plastic into a shaped cavity defined by the coupled dies 103 and 104. With this, the lower resiliency plastic layer 105 is molded in the coupled dies 103 and 104. Then, the movable die 104 is disengaged from the first fixed die 103 and coupled with the second fixed die 106 and then the second resin feeding cylinder 108 injects the material for the higher resiliency plastic into the newly coupled dies 106 and 104. With this, the higher resiliency plastic layer 107 is molded or laid on the lower resiliency plastic layer 105.

According to the above, upon completion of the injection molding by the coupled dies 103 and 104, the movable die 104 is shifted from the first fixed die 103 to the second fixed die 106 having the injected lower resiliency plastic layer 105 kept in the movable die 104. As seen in FIG. 9, in order to keep the plastic layer 105 in the movable die 104 during such shifting, the movable die 104 has from a bottom wall a rectangularly extending retaining ridge 109 having a dove-tail cross section. Therefore, upon injection molding of the material for the lower resiliency plastic layer 105, the retaining ridge 109 is immersed in the injected material 105 in a manner to retain the same (viz., hardened plastic layer 105). To assure the retaining function of the retaining ridge 109, it is preferable to increase the inclination "θ" of each side wall 109a of the retaining ridge 109. Thus, the retaining ridge 109 has a so-called "dove-tail" shaped cross section.

However, the retaining ridge 109 having the above-mentioned construction brings about the following drawbacks.

That is, after molding the higher resiliency plastic layer 107 on the lower resiliency plastic layer 105, it becomes necessary to release a molded article, that is, a double-layered cassette half, from the movable die 104. Thus, due to the removal, the lower resiliency plastic layer 105 is forced to have an elongate groove (no numeral) therein as is shown in FIG. 9, which is caused by the retaining ridge 109. However, as is seen from the same drawing, because of the dove-tail cross section possessed by the retaining ridge 109, the lower resiliency plastic layer 105 is forced to have burrs 111 (viz., protruded lips) around the elongate groove, which lower the smoothness of the inner surface 105a of the cassette half. As is known, when the inner surface 105a of the tape cassette is not smoothed, smoothed movement of a tape in the cassette is not expected. Of course, when the inclination angle "θ" of the side wall 109a of the projection 109 is reduced, the undesirable burrs 111 can be reduced in size. However, in this case, the retaining function of the retaining ridge 109 to the lower resiliency plastic layer 105 is sacrificed.

SUMMARY OF THE INVENTION

It is therefore an object of the present invention to provide a method and a device for molding a cassette, which are free of the above-mentioned drawbacks.

According to a first aspect of the present invention, there is provided a method for molding a cassette, which method comprises by steps (a) preparing fixed and movable dies which are unitable to define therewithin a shaped cavity, the movable die having on an inner surface a retaining ridge, the retaining ridge including a first portion immediately projected from the inner surface and a second portion immediately projected from the first portion, the second portion having side walls at least one of which has a laterally extending projection at the position remote from the first portion; (b) coupling the fixed and movable dies to define the shaped cavity therewithin; (c) injecting a plastic material into the shaped cavity in such a manner that the retaining ridge is immersed in the injected plastic material; and (d) uncoupling the fixed and movable dies and releasing a cured molded article of the plastic material from the movable die.

According to a second aspect of the present invention, there is provided a rotary type injection molding device which comprises a first fixed die to which a first resin supplier is connected; a second fixed die to which a second resin supplier is connected; and a movable die which is movable between a first position wherein the movable die is coupled with the first fixed die to define therewithin a first shaped cavity and a second position wherein the movable die is coupled with the second fixed die to define therewithin a second shaped cavity, wherein the movable die has on an inner surface a retaining ridge which comprises a first larger portion immediately projected from the inner surface and a second smaller portion immediately projected from the first larger portion, the second smaller portion having side walls at least one of which has a laterally extending projection at the position remote from the first larger portion.

According to a third aspect of the present invention, there is provided a molded cassette which comprises upper and lower cassette halves which are united to constitute a case, each cassette half including a first plastic layer having an inner surface facing the interior of the case; and a second plastic layer laid on an outer surface of the first plastic layer, wherein the first plastic layer is formed with a groove which is exposed to the interior of the case, the groove being formed at its side walls with burrs which are entirely positioned within the groove.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Figure 1:
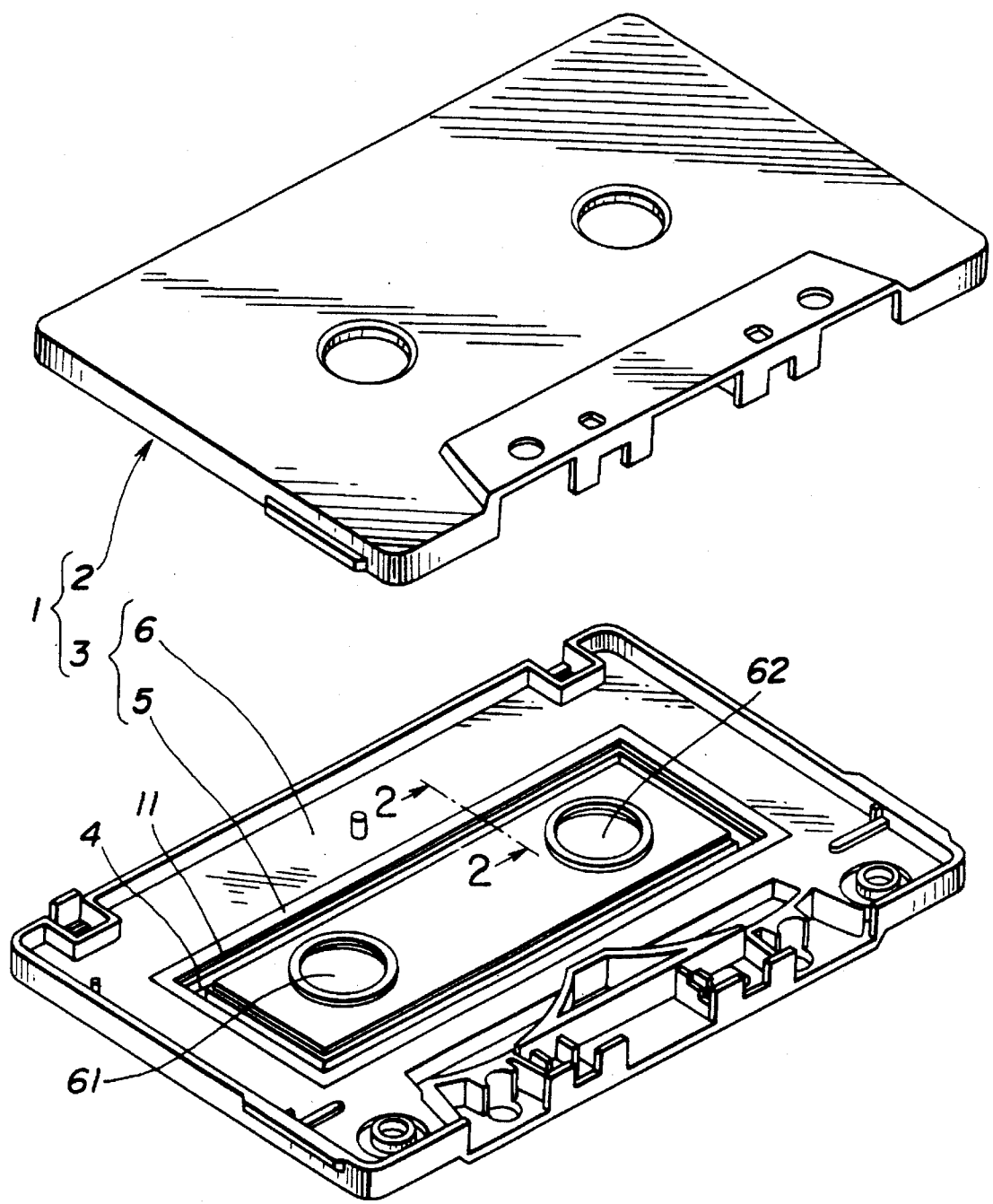
FIG. 1 is an exploded view of a tape cassette which is produced through the present invention.

Referring to FIG. 1, there is shown a tape cassette which is produced through the present invention. The tape cassette 1 comprises an upper cassette half 2 and a lower cassette half 3 which are united to constitute a rectangular case for receiving therein two reels (not shown) and a length of recording cape (not shown) wound on the reels. Designated by numerals 61 and 62 are openings for receiving driving hubs of a cassette tape player (not shown).

Similar to the above-mentioned conventional cassette half, each cassette half 2 or 3 has a double-layered structure which comprises a lower resiliency plastic layer 5 (or inner layer) and a higher resiliency plastic layer 6 (or outer layer) which are laid on each other.

Figure 2:
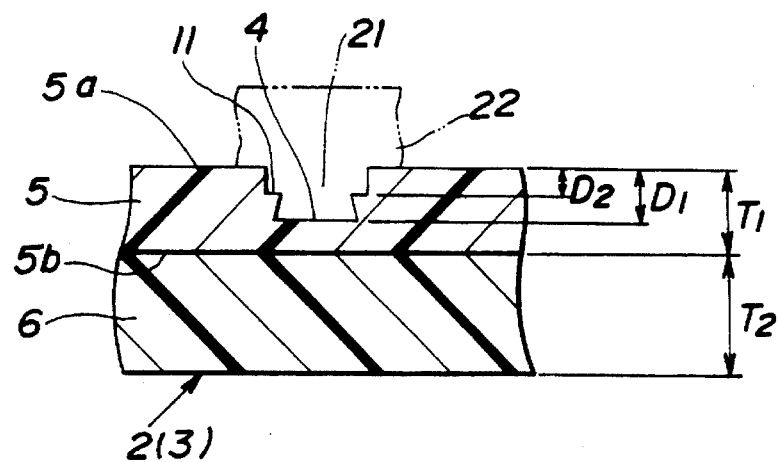
FIG. 2 is an enlarged sectional view taken along the line 2—2 of FIG. 1.

As is seen from FIGS. 1 and 2, the lower resiliency plastic layer 5 has at its inner surface 5a a rectangularly extending groove 4 which was formed by an after-mentioned retaining ridge 21 (see FIG. 2) possessed by a movable die 22. The groove 4 is shaped to surround the two openings 61 and 62. According to FIG. 2, the groove 4 has a unique cross section in order to solve or at least minimize the undesirability caused by burrs. That is, the groove 4 has at its side walls respective terraced portions 11, as shown.

The lower resiliency plastic layer 5 is constructed of NYLON (trade name), polypropylene, polyurethane or the like and has the thickness T1 of about 0.6 mm. While, the higher resiliency plastic layer 6 is constructed of NYLON mixed with inorganic material, such as zinc oxide, aluminium silicate or the like and has the thickness T2 of about 1.2 mm. Thus, the higher resiliency plastic layer 6 forms the structural base of the cassette half. Due to presence of the lower resiliency plastic layer 5, vibration applied to the cassette is suitably absorbed. The depth D1 of the groove 4 is about 0.4 mm, and each side wall of the groove 4 below the terraced portion 11 has the inclination of about 5 degrees. The depth D2 of the terraced portion 11 is about 0.2 mm.

For producing the cassette half 2 or 3, a rotary type injection molding device similar to the afore-mentioned device 101 is used. However, in the present invention, the rectangularly extending retaining ridge 21 possessed by the movable die 22 has the shape corresponding to that of the above-mentioned groove 4 of the lower resiliency plastic layer 5.

Figure 3:
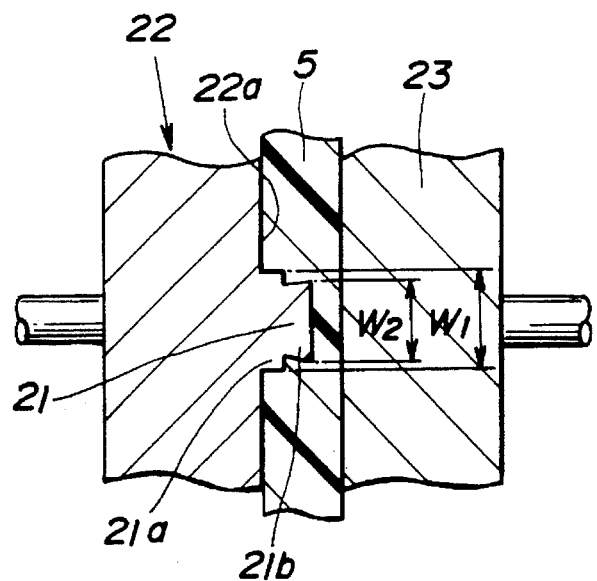
FIG. 3 is a sectional view showing a condition wherein a lower resiliency plastic layer of a half (viz., cassette half) of the tape cassette is being molded.

That is, as is seen from FIG. 3, the retaining ridge 21 comprises a first portion 21a which is projected immediately from a bottom wall 22a of the movable die 22 and a second portion 21b which is projected immediately from the first portion 21a. The width W2 of the second portion 21b is smaller than the width W1 of the first portion 21a, and the second portion 21b has inclined side walls (no numerals) so that the second portion 21b has a so-called dove-tail cross section. It is to be noted that side walls (no numerals) of the first portion 21a are somewhat tapered, that is, slightly inclined relative to the bottom wall 22a of the movable die 22.

Figure 4:
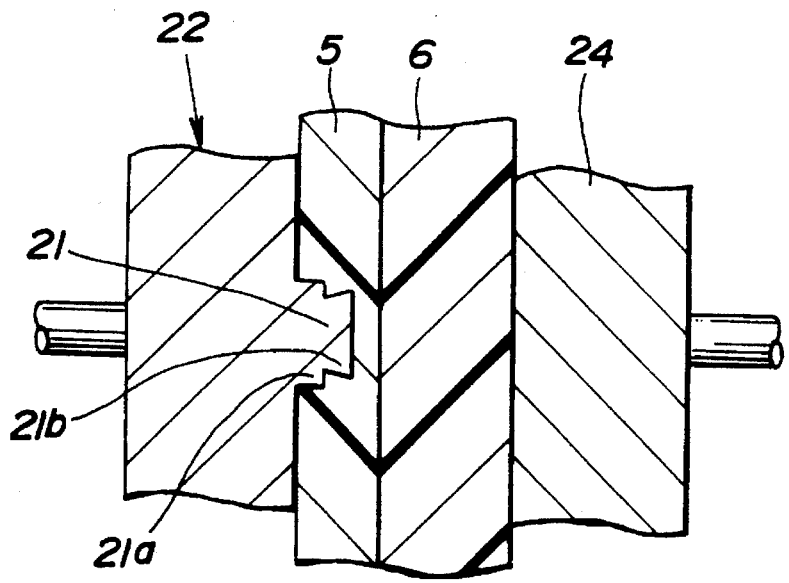
FIG. 4 is a sectional view showing a condition wherein a higher resiliency plastic layer of the cassette half is being molded.

For producing the cassette half 2 or 3, the following steps are taken, which will be described with reference to FIGS. 3, 4 and 5.

First, as is understood from FIG. 3, the movable die 22 is coupled with the first fixed die 23, and then, the material for the lower resiliency plastic layer 5 is injected into a shaped cavity defined by the coupled dies 22 and 23. With this, the lower resiliency plastic layer 5 is molded in the cavity. Then, the movable die 22 is disengaged from the first fixed die 23, and, as is understood from FIG. 4, the movable die 22 is coupled with a second fixed die 24. Because of the dove-tail construction possessed by the second portion 21b of the retaining ridge 21, the lower resiliency plastic layer 5 is assuredly kept in the movable die 22 during the shifting of the die 22 from the first fixed die 23 to the second fixed die 24. Then, the material for the higher resiliency plastic layer 6 is injected into a shaped cavity defined by the coupled dies 22 and 24. With this, the higher resiliency plastic layer 6 is molded or laid on the lower resiliency plastic layer 5, as is seen from FIG. 4. Thus, a double-layered cassette half 2 or 3 is produced.

Figure 5:
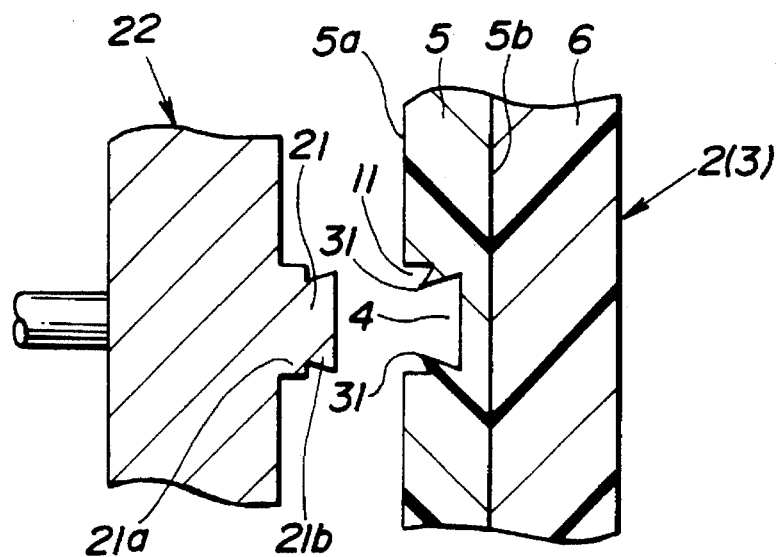
FIG. 5 is a sectional view showing a condition wherein the molded cassette half is being released from a movable die.

Then, as is seen from FIG. 5, after disengagement of the movable die 22 from the second fixed die 24, a molded article, viz., a cassette half 2 or 3 thus produced, is released from the movable die 22. Because the retaining ridge 21 of the movable die 22 has the dove-tail construction at the second portion 21b, the lower resiliency plastic layer 5 is forced to have burrs 31 at the groove 4. However, as seen in the drawing, in the present invention, the burrs 31 are entirely positioned in the groove 4, which means that the smoothness of the inner surface 5a of the cassette half 2 or 3 is not affected by the burrs 31. Thus, smoothed running of the tape in the tape cassette 1 is assured in the present invention. Because the side walls of the first portion 21a of the retaining ridge 21 are tapered, the mouth portion of the groove 4 is suppressed from forming burrs.

Figure 6:
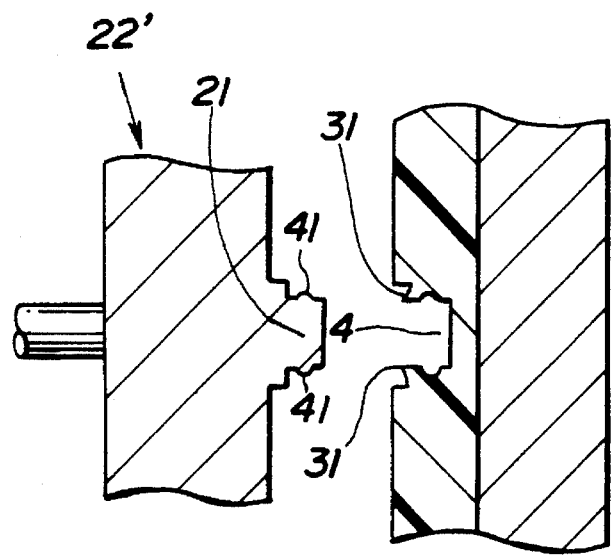
FIG. 6 is a view similar to FIG. 5, but showing another movable die which is usable in the present invention.

Referring to FIG. 6, there is shown another movable die

22' which is usable in the present invention. In this movable die 22', convex ridges 41 are formed on parallel side walls of the second portion of the retaining ridge 21. Also in this case, the burrs 31 produced are located within the groove 4, as shown.

Figure 7:
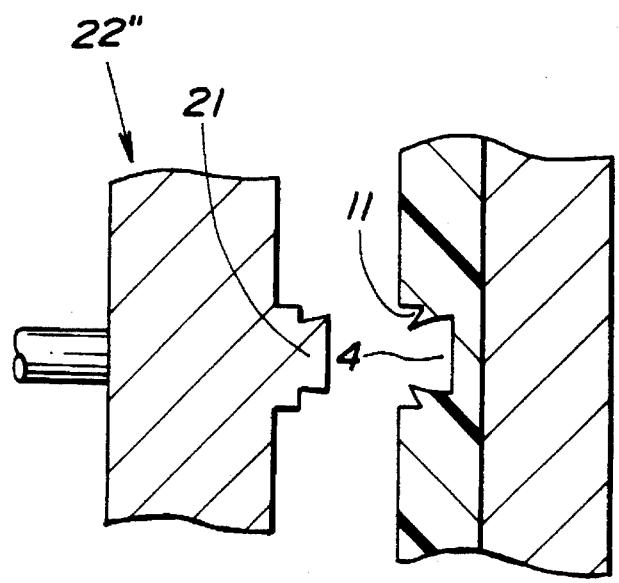
FIG. 7 is a view similar to FIG. 5, but showing still another movable die which is also usable in the present invention.
Figure 8:
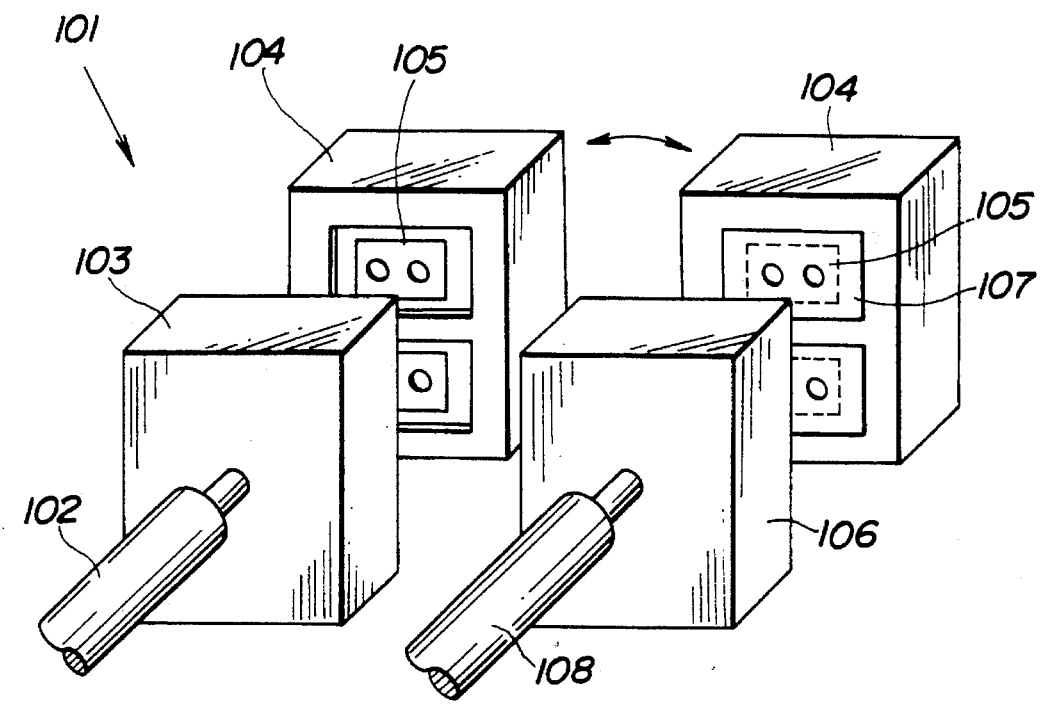
FIG. 8 is an illustration of a conventional rotary type injection molding device.
Figure 9:
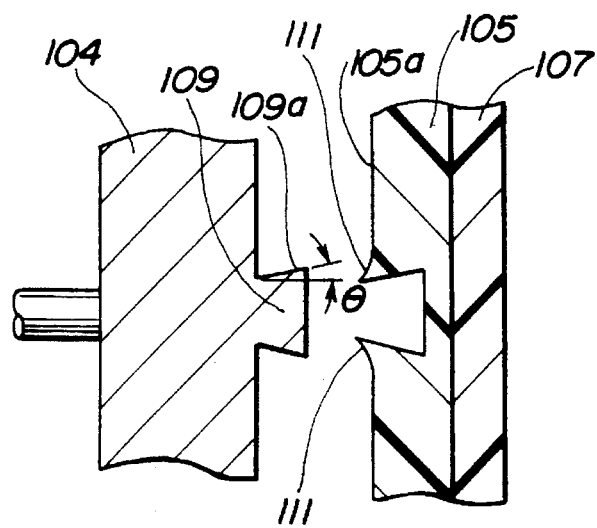
FIG. 9 is a view similar to FIG. 5, but showing a drawback possessed by a conventional molding method.

Referring to FIG. 7, there is shown still another movable die 22" which is also usable in the present invention. In this movable die 22", only one of the side walls of the second portion of the retaining ridge 21 is inclined, as shown.

In the following, modifications of the invention will be described.

In place of the rectangularly extending retaining ridge 21, a plurality of retaining projections may be used so long as each projection has the same cross section as that of the ridge 21.

If a sufficient retaining function is obtained, the inclination of each side wall of the second portion 21b may be less than 5 degrees.

Although the above description is directed to a tape cassette, the measure possessed by the present invention is also applicable to a disc cassette.

What is claimed is:

1. A molded cassette comprising:

upper and lower cassette halves united to constitute a case, each cassette half including:

a first plastic layer having an inner surface facing an interior of said case; and a second plastic layer formed on an outer surface of said first plastic layer, wherein said first plastic layer is formed with a groove exposed to the interior of said case, said groove being formed with side walls having terraced portions such that a top portion of said groove is wider than a bottom portion of said groove, and said side walls of said groove are formed with burrs entirely positioned within said groove.

2. A molded cassette as claimed in claim 1, in which said burrs are so shaped as to cause said side walls of the groove to have inclined parts near a bottom of the groove.

3. A molded cassette as claimed in claim 2, in which a distance between said inclined parts increases toward said bottom of the groove.

4. A molded cassette as claimed in claim 3, in which an opening part of said groove is tapered.

5. A molded cassette as claimed in claim 1, in which said first plastic layer is constructed of a plastic material having a predetermined resiliency and said second plastic layer is constructed of a plastic material having a higher resiliency than said predetermined resiliency.

* * * * *